United States Patent [19]

Hudson et al.

[11] Patent Number: 4,720,970
[45] Date of Patent: Jan. 26, 1988

[54] SECTOR AIRFLOW VARIABLE GEOMETRY COMBUSTOR

[75] Inventors: Dale A. Hudson, Beavercreek; Kenneth N. Hopkins, Centerville, both of Ohio

[73] Assignee: The United States of America as represented by the Secretary of the Air Force, Washington, D.C.

[21] Appl. No.: 439,492

[22] Filed: Nov. 5, 1982

[51] Int. Cl.$^4$ ............................................. F02C 3/00
[52] U.S. Cl. .................................. 60/39.36; 60/39.37
[58] Field of Search ............... 60/39.27, 39.29, 39.37, 60/39.36, 724

[56] References Cited

U.S. PATENT DOCUMENTS

| | | | |
|---|---|---|---|
| 2,662,371 | 12/1953 | Rennie et al. | 60/39.21 |
| 2,676,460 | 4/1954 | Brown | 60/39.65 |
| 2,676,461 | 4/1954 | Gove | 60/39.74 |
| 3,605,405 | 9/1971 | Du Bell | 60/39.65 |
| 3,657,883 | 4/1972 | De Corso | 60/39.37 |
| 3,826,077 | 7/1974 | Quigg et al. | 60/39.02 |
| 3,937,008 | 2/1976 | Markowski et al. | 60/39.06 |
| 4,151,711 | 5/1979 | Fromm et al. | 60/39.29 |
| 4,158,949 | 6/1979 | Reider | 60/39.32 |
| 4,255,927 | 3/1981 | Johnson et al. | 60/39.37 |
| 4,356,693 | 11/1982 | Jeffery et al. | 60/39.37 |

*Primary Examiner*—Louis J. Casaregola
*Assistant Examiner*—T. Thorpe
*Attorney, Agent, or Firm*—Bobby D. Scearce; Donald J. Singer

[57] ABSTRACT

An improved annular combustor having a plurality of annularly disposed fuel nozzles for supplying fuel to the combustor dome, and a structure defining a dome plenum adjacent each said fuel nozzle is provided, wherein means in the form of partitions or walls are included to define a sector(s) of said plenum including a portion of said fuel nozzles for airflow control by a valve means controlling airflow through said sector(s) only, the remainder of said dome plenum annulus having no airflow valve control means; said sector(s) defining means may protrude into said combustor primary zone to define a region thereof for controlled burning of fuel supplied by the fuel nozzles included in said sector.

5 Claims, 5 Drawing Figures

SECTOR AIRFLOW VARIABLE GEOMETRY COMBUSTOR

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of gas turbine engines and combustors therefor, and more particularly to improvements in means controlling combustor dome plenum airflow to the primary combustion zone of a variable geometry combustor.

Conventional variable geometry combustors are characteristically configured to control the fuel/air ratio in the primary zone, that is, in the primary burning region of the combustor. This configuration is ordinarily desirable because the primary zone tends to be excessively fuel rich at high engine power levels, but tends to become excessively fuel lean at low power, at idle, during engine deceleration, during ground starts, and at times during windmill air starts. However, these variations in fuel/air ratios in the primary zone ordinarily result in generally low fuel combustion efficiency for engine operation at other than high power levels with the attendant undesirable emission of pollutants; further, engine operation may be characterized by poor starting, unstable fuel combustion, hot streaks at high power and flameout. Certain conventional variable geometry combustors are configured both to control the primary zone fuel/air ratio and to maintain a generally constant air velocity exiting the combustor liner holes in the low power mode, that is, with the dome air valves closed. Other conventional configurations control the fuel/air ratio in the primary zone by locally controlling the airflow (axial air staging) or by locally controlling the fuel flow (fuel staging). Fuel staging has been accomplished by controlling upstream and/or downstream fuel flow (axial staging) or by circumferentially controlling fuel flow (sector burning). Axial air staging has been accomplished by controlling air to the primary zone using only dome air valves, or using only downstream valves, or using both.

The present invention comprises a means to attain circumferential air staging in the primary zone of a gas turbine engine. This is accomplished by varying the airflow to the primary zone of the engine by regulating dome plenum sector air valves that feed selected dome sectors to achieve desirable local fuel/air ratios in those dome sectors controlled by these valves. Combustor plenum sector air valve(s) are therefore included only for the sector(s) of the annular combustor region where the fuel/air ratio is to be controlled, rather than for the entire annular region. The remaining (uncontrolled) annular sector(s) of the combustor require no valves When the dome plenum sector air valves of the present invention are closed, the pressure drop across the combustor liner increases with an attendant increase in hole jet velocity through the remaining air holes in the combustor liner, however, these increases are small compared to that experienced with the conventional variable geometry configuration wherein the airflow is controlled over the full 360° annulus of the dome air plenum. In the conventional configuration it has been necessary to simultaneously open valves provided in the hot downstream portion of the combustor liner to offset the reduction of airflow in the primary zone to prevent the large increases in combustor liner pressure differential and hole jet velocity. In comparison to the conventional variable geometry configuration, the present invention may be characterized by fewer moving parts, lower weight, reduced frictional wear, fewer and lesser complexity actuators, lesser required actuator force, elimination of certain thermal expansion problems, minimal problems associated with valve binding, and increased combustion stability and resistance to flameout. Further, the present invention eliminates any requirement for air valves at the downstream end of the combustor that open simultaneously with the dome air valves to provide a constant area of open holes in the liner. Consequently, the need for synchronized actuation linkages and associated parts is eliminated.

The sectored dome airflow control provided by the present invention permits reduced aircraft turbopropulsion deceleration time thereby providing a tactical advantage and improved safety during landing by providing the capability to quickly reduce engine thrust without flameout. The engine smoke number is reduced, rendering the aircraft less detectable and more pollution free. If flameout occurs, the combustor may be relighted more quickly, at lower ambient temperature at a higher altitude and/or at a lower flight mach number than presently possible with conventional combustors.

It is, therefore, an object of the present invention to provide an improved gas turbine engine.

It is a further object of the invention to provide an improved efficiency combustor for a gas turbine engine.

It is a further object to provide an improved annular combustor characterized by sectored circumferential air control.

It is yet a further object of this invention to provide a combustor having sectored dome airflow control for improved resistance to flameout, for improved ignition characteristics, and which is characterized by fewer moving parts.

These and other objects of the present invention will become apparent as the detailed description of certain representative embodiments thereof proceeds.

SUMMARY OF THE INVENTION

In accordance with the foregoing principles and objects of the present invention, an improved annular combustor having a plurality of annularly disposed fuel nozzles for supplying fuel to the combustor dome, and a structure defining a dome plenum adjacent each said fuel nozzle is provided, wherein means in the form of partitions or walls are included to define a sector(s) of said plenum including a portion of said fuel nozzles for airflow control by a valve means controlling airflow through said sector(s) only, the remainder of said dome plenum annulus having no airflow valve control means; said sector(s) defining means may protrude into said combustor primary zone to define a region thereof for controlled burning of fuel supplied by the fuel nozzles included in said sector.

In another embodiment of the invention, the dome plenum(s) may be configured to include only individual fuel nozzles within each of a plurality of sectors, which may be individually controlled, or controlled in groups.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
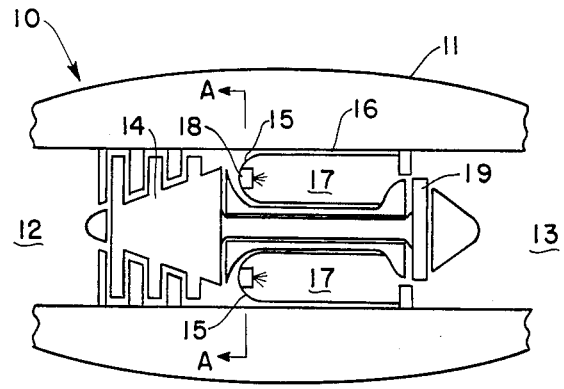
FIG. 1 is a schematic axial sectional view of a conventional gas turbine engine suitable for incorporation of the present invention.

Referring now to the drawings, FIG. 1 shows a schematic axial sectional view of a conventional gas turbine engine 10, representative of that into which the invention herein may be incorporated. Engine 10 may conventionally comprise suitable supporting structure 11, defining air inlet and diffuser region 12 and afterburner and discharge region 13. Compressor 14 provides flow through combustor dome 15 and combustor liner 16 into primary combustion chamber 17. Fuel is supplied to the combustor through an annular array of fuel nozzles 18 within combustor 16. A turbine 19 may be disposed conventionally substantially as shown in FIG. 1 downstream of the combustor 16.

Figure 2:
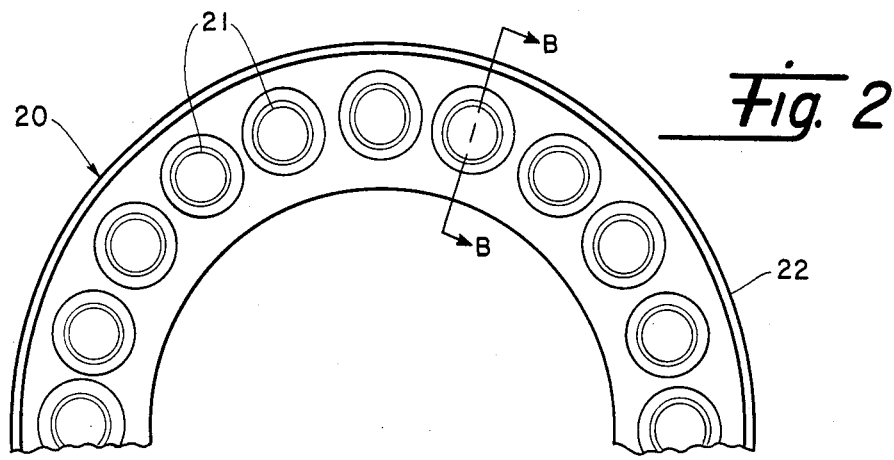
FIG. 2 is a partial sectional schematic of the annularly-shaped structure of a conventional combustor including a plurality of annularly disposed fuel nozzles and a full annulus dome air control valve.

Referring now to FIG. 2, shown therein in a partial schematic cross section of the annular portion of a variable geometry combustor 20 of conventional design showing placement of a plurality of annularly disposed fuel nozzles 21. The sectional view of combustor 20 as presented in FIG. 2 may, for purposes of clarity, be considered as representative of a sectional view of annular dome 15 of FIG. 1 as viewed along lines A—A. The conventional design of variable geometry combustor 20, as presented in FIG. 2, includes dome air valve 22 surrounding substantially the entire 360° annulus of combustor 20, and controlling airflow to all of fuel nozzles 21.

Figure 3:
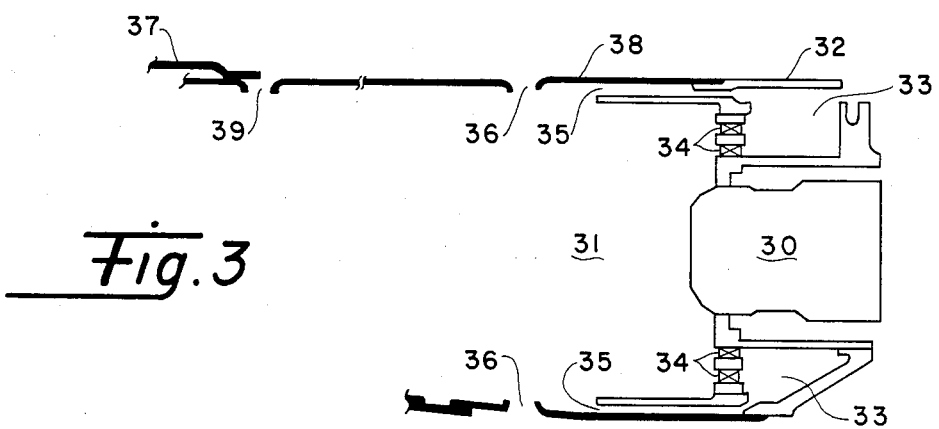
FIG. 3 is a view taken along line B—B of FIG. 2 showing typical fuel nozzle support and dome air plenum and combustor dome structures.

Referring now to FIG. 3, which is a view taken substantially along lines B—B of FIG. 2, shown therein is a sectional view of the structure of the combustor dome annulus supporting a fuel nozzle 30 and defining dome air plenum 33. As shown therein, fuel nozzle 30 supplies fuel for combustion in combustor primary zone 31. Dome air valve 32 controls the supply of air through dome air plenum 33 and air swirlers 34 and cooling air passages 35 for fuel combustion and liner cooling in combustor primary zone 31. Additional dilution air passages 36 and 39 and associated air control valves 37 are included in order to provide optimum fuel/air ratios within the combustor primary zone 31. Combustors are ordinarily configured to use a predetermined percentage of the total airflow through the combustor liner primary zone for fuel combustion. For example, as discussed hereinafter in relation to Tables I and II, a combustor may be designed for using 40%, 65%, or other predetermined percentage, which is taken as the portion of airflow entering combustor primary zone 31 through dome valves 32 (but does not include that entering through dilution air passages 36 and 39). In variable geometry combustors having conventional dome air control valves 22, such as that suggested in FIG. 2, when combustor dome airflow is reduced, the pressure drop across the combustor liner 38 (see FIG. 3) significantly increases due to the reduction in the total area of open holes in the liner available for airflow into the combustor. Although this configuration may be effective for increasing the fuel/air ratio in the primary combustion zone 31, the air velocity through the remaining open holes (e.g., dilution holes 36 and 39) on the combustor liner 38 increases undesirably, which is a primary cause of combustion instability and flameout. The additional air valves 37 are often provided in the downstream region of the combustor liner to operate so as to open when the dome air valves 32 of the conventional design are closed, thereby providing a substantially constant open hole area to preclude substantially increased pressure differentials across the combustor liner 38 and substantially increased air velocities through the remaining open holes. Although effective in increasing the primary combustion zone fuel/air ratio without significant increase in air velocities, this configuration is characterized by undesirably complex structure and linkages associated with the control and synchronization of the additional air valves 37.

Figure 5:
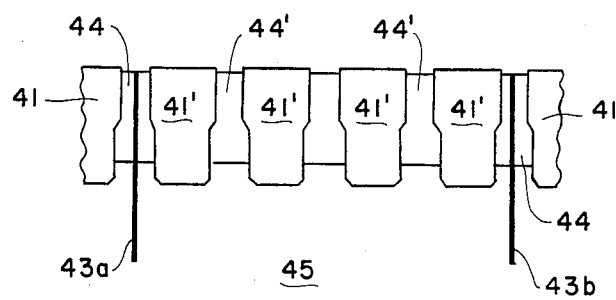
FIG. 5 is a sectional view taken along arcuate line C—C of FIG. 4 showing the placement of the partitions defining a sector including a portion of the fuel nozzles according to the present invention.
Figure 4:
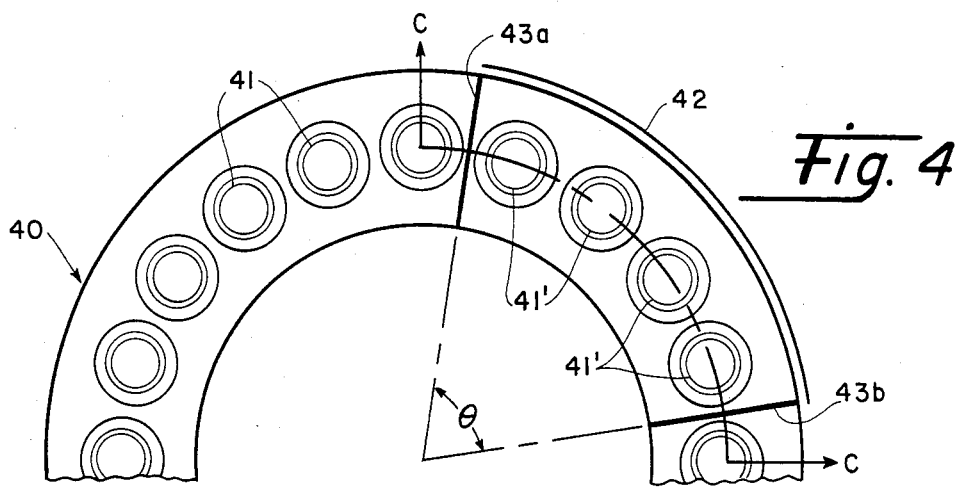
FIG. 4 is a partial sectional view of an annular combustor having the sectored configuration of the present invention.

Referring now to FIG. 4, shown therein is a sectional view of an annular combustor 40 having the sectored dome air control configuration of the present invention. As shown therein, annular combustor 40 includes an annular array of a plurality of fuel nozzles 41. A dome air valve 42 controls the flow of air through only an annular segment $\theta$ of the combustor 40 substantially as shown in FIG. 4, and is effective for controlling airflow to a predetermined limited number of fuel nozzles 41' included in the sector $\theta$. A pair of sector partitions or end walls 43a and 43b are provided to isolate fuel nozzles 41' from the remainder of the annular array of fuel nozzles 41, and enclose substantially the same annular segment $\theta$ of combustor 40 as that effected by dome air valve 42. FIG. 5 is a partial sectional schematic view taken along arcuate line C—C of FIG. 4. As shown therein, the combustor 40 structure supporting fuel nozzles 41 and 41' define a dome air plenum sector 44 in that portion of the dome plenum not controlled by sectored dome air valve 42, and a segmented dome plenum section 44' further defined by sector end walls 43a and 43b. As shown, sector endwalls 43a and 43b limit the flow of air to the fuel nozzles 41' included in the sector $\theta$. Further, sector endwalls 43a and 43b may be limited to the dome plenum 44 or may extend any desired distance into combustor dome 45 (region of fuel combustion) in order to segregate, to the extent desirable or feasible, the annular segment of the combustor dome 45 where combustion of fuel from fuel nozzles 41' takes place, from the remainder of dome 45 fueled by fuel nozzles 41. The number of fuel nozzles 41' included in the sectored configuration presented in FIG. 4 may vary depending on the particular combustor design, the total number of fuel nozzles included therein, the desired number of fuel nozzles to be included in the sector(s), and the number and location of fuel nozzles selected for fuel throttle control. Therefore, the number (four) of fuel nozzles depicted in FIGS. 4 and 5 as being included in the sector(s) controlled by valve 42 is not considered limiting hereof. However, as hereinafter discussed in relation to the representative configurations described in Table II, up to about 20% of the total fuel nozzles in the combustor as being included in the sector $\theta$ may be optimum. The fuel nozzles 41' included in the sector may be configured for independent fuel control, within the contemplation hereof, to optimize overall operation of combustor 40 and otherwise meet the objectives of the present invention.

In the operation of the sectored configuration of the present invention as suggested in FIGS. 4 and 5, only a preselected portion of the primary zone air holes (equivalent to 34 and 35 of FIG. 3) are closed with the closure of dome air valve 42 when it is desired to increase the fuel/air ratio in the combustion zone represented by combustor dome 45. By closing off only a portion of the dome plenum airflow (i.e., through plenum 44' of FIG. 5), the sectored configuration of the present invention permits the major portion of the dome flow area (i.e., the air swirlers and cooling air holes adjacent the remaining fuel nozzles 41) to remain open. This results in minimizing the pressure difference increase across the combustor liner, and in minimal increase in hole jet velocities.

In the comparison of the conventional variable geometry combustor configurations including substantially full 360° annular dome airflow control, with the configuration of the present invention herein comprising sectored dome airflow control, the following calculations taken in conjunction with Tables I and II hereinafter discussed will show the significant advantages of the present invention over the existing variable geometry combustor configurations. Assuming that the airflow through the combustor dome is incompressible, that the total air mass flow rate through the combustor liner is constant and not effected substantially by closing the dome air valves, and that the discharge coefficients for all air holes are substantially equal, then the total airflow rate $\dot{W}$ through all open holes in the combustor liner may be given by, $$\dot{W} = CA_T \sqrt{\Delta P},$$

where $\Delta P$ is the pressure difference across the combustor liner, C is a proportionality constant, and $A_T$ is the total area of open holes in the combustor liner. Therefore, assuming a constant total airflow, $\Delta P$ is proportional to the inverse square of $A_T$, and $$\frac{(\Delta P)_C}{(\Delta P)_O} = \frac{1}{(A_{TC}/A_{TO})^2}$$

where $A_{TO}$ is the area of open holes with the dome valves open and $A_{TC}$ is the area of open holes with the valves closed. Under the foregoing assumption, the continuity equation provides that the flow rate $\dot{W}=\rho A V$ where V is the flow velocity of air of density $\rho$ through a hole of area A. Therefore, $$\frac{V_C}{V_O} = \frac{1}{A_{TC}/A_{TO}}$$

where $V_O$ and $V_C$, respectively, are the hole jet velocities with the dome valves opened and closed.

Providing sector airflow in the dome of the combustor according to the present invention, by maintaining control of the airflow through only a portion of the dome plenum, permits a substantial portion of the dome flow area to remain open at all fuel flow levels, which results in minimal increase of pressure differential $\Delta P$ across the combustor liner, and minimal increase of airflow velocity V when the sectored dome valve(s) is closed. The magnitude of increase in $\Delta P$ and V depends upon the percent of total airflow affected by the sectored dome airflow valve(s). The effects of controlling the airflow in a sector of the dome plenum as compared to conventional control of the total airflow through the entire annulus of the combustor dome for two representative configurations are illustrated in Table I and Table II.

Airflow characteristics for combustors having dome air valves controlling the full 360° dome annulus are shown in columns A, B and C of Table I, for two configurations comprising 20 and 30 annularly disposed fuel nozzles. Since it is extremely desirable to flow a large percentage of air through the dome at high engine power to obtain an optimum fuel/air ratio in the primary combustion zone, the examples included in columns B and C (65% dome airflow) are the more illustrative examples for the purposes of comparison with the invention. When the dome air valves for the existing full annular control configuration are closed, the magnitude of the pressure drop across the liner ($\Delta P_C/\Delta P_O$) increases by a factor of 8.16 over that when the dome air valves are open. At the same time, the hole jet velocity increases by a factor ($V_C/V_O$) of 2.86. Both increases are undesirably high to ensure against flameout or to facilitate relighting the combustor.

TABLE I

AIRFLOW CHARACTERISTICS FOR CONVENTIONAL VGC COMBUSTORS HAVING FULL ANNULAR DOME AIR VALVES

|  | Combustor Configuration | | |
| --- | --- | --- | --- |
|  | A | B | C |
| Number of Fuel Nozzles | 20 | 20 | 30 |
| % Total Airflow thru Dome | 40% | 65% | 65% |
| Fuel Nozzles Affected by Closing Dome Valves | 20 | 20 | 30 |
| % Dome Airflow Area Open w/Closed Dome Valves | 0 | 0 | 0 |
| $A_{TC}/A_{TO}$ | 60% | 35% | 35% |
| $\Delta P_C/\Delta P_O$ | 2.78 | 8.16 | 8.16 |
| $V_C/V_O$ | 1.67 | 2.86 | 2.86 |

TABLE II

AIRFLOW CHARACTERISTICS FOR COMBUSTOR HAVING SECTORED DOME AIRFLOW

|  | Sectored Airflow Configuration | | | | | | |
| --- | --- | --- | --- | --- | --- | --- | --- |
|  | D | E | F | G | H | I | J |
| No. of Fuel Nozzles | 20 | 20 | 20 | 30 | 30 | 30 | 30 |
| % Tot Airflow thru Dome | 40% | 40% | 65% | 65% | 65% | 65% | 65% |
| Fuel Nozzles Affected by Closing Valves | 4 | 2 | 4 | 3 | 6 | 4 | 2 |
| % Dome Airflow Area Open w/Valves Closed | 80% | 90% | 80% | 90% | 80% | 87% | 93% |
| $A_{TC}/A_{TO}$ | 92% | 96% | 87% | 94% | 87% | 92% | 95% |
| $\Delta P_C/\Delta P_O$ | 1.18 | 1.09 | 1.32 | 1.13 | 1.32 | 1.18 | 1.11 |
| $V_C/V_O$ | 1.09 | 1.04 | 1.15 | 1.06 | 1.15 | 1.09 | 1.05 |

Referring now to Table II, shown therein are the airflow characteristics for the sectored dome configuration of the present invention for annular combustors comprising 20 and 30 fuel nozzles and percentage dome airflow of 40% and 65%. The advantage realized through the use of the invention herein is apparent from, for example, the 65% airflow numbers which show that the pressure drop across the combustor liner for even the most conservative case, increases by a factor ($\Delta P_C/\Delta P_O$) of only about 1.32, with an increase in hole jet air velocity by a factor ($V_C/V_O$) of only 1.15. Lower magnitude increases in $\Delta P$ and $V$ may be achievable depending on the number of air valves selected for closing consistent with maintaining suitable local fuel/air ratios to prevent flameout. It is clear, however, that the increases in pressure drop and hole jet velocities characteristic of the representative configurations of the present invention are sufficiently small to maintain combustion in the primary combustion zone and to provide good reignition characteristics in the event of flameout.

It is understood that the novel combustor of the present invention may, within the intended scope hereof, comprise more than one sector, each including one or more fuel nozzles and a controlling sectored valve. Further, the dome plenum(s) may be configured to define a sector for each individual fuel nozzle, the airflow through each sector being controlled individually or in groups.

The present invention, as hereinabove described, therefore provides an improved combustor configuration which may be particularly advantageous as incorporated into a gas turbine engine, and which is characterized by improved combustion control. It is understood that certain modifications to the invention as described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

We claim:

1. A combustor, comprising:
    a. a plurality of annularly disposed fuel nozzles for supplying fuel for combustion;
    b. means defining an annularly-shaped combustion zone near said fuel nozzles;
    c. means defining an annularly-shaped air plenum surrounding said fuel nozzles and having a plurality of openings near said fuel nozzles for supplying air for fuel combustion in said combustion zone;
    d. wall means separating a predetermined angular sector of said annular air plenum from the remainder thereof, said angular sector including a predetermined portion of said plurality of fuel nozzles, whereby the airflow within said plenum to said predetermined portion of said fuel nozzles is isolated from the airflow to the remaining fuel nozzles of said combustor not within said sector; and
    e. valve means for controlling the flow of air only through said sector.

2. The combustor as recited in claim 1 wherein said sector includes at least one fuel nozzle but less than all of said fuel nozzles included in said combustor.

3. The combustor as recited in claim 1 wherein said wall means protrudes into said combustion zone and separates that angular portion of said combustion zone adjacent said sector from the remainder of said combustion zone.

4. A combustor, comprising:
    a. a plurality of annularly disposed fuel nozzles for supplying fuel for combustion;
    b. means defining an annularly-shaped combustion zone near said fuel nozzles;
    c. means defining an annularly-shaped air plenum surrounding said fuel nozzles and having a plurality of openings near said fuel nozzles for supplying air for fuel combustion in said combustion zone;
    d. wall means within said plenum defining a plurality of angular sectors of said annular plenum, each of said sectors including a predetermined portion of said plurality of said fuel nozzles and said air supply openings; and
    e. valve means for controlling the flow of air through only a portion of said sectors.

5. A gas turbine engine plant including a compressor, turbine and combustor, wherein said combustor comprises:
    a. a plurality of annularly disposed fuel nozzles for supplying fuel for combustion;
    b. means defining an annularly-shaped combustion zone near said fuel nozzles;
    c. means defining an annularly-shaped air plenum surrounding said fuel nozzles and having a plurality of openings near said fuel nozzles for supplying air for fuel combustion in said combustion zone;
    d. wall means separating a predetermined angular sector of said annular air plenum from the remainder thereof, said angular sector including a predetermined portion of said plurality of fuel nozzles, whereby the airflow within said plenum to said predetermined portion of said fuel nozzles is isolated from the airflow to the remaining fuel nozzles of said combustor not within said sector; and
    e. valve means for controlling the flow of air only through said sector.

* * * * *